US009959355B2

(12) United States Patent
Chitta et al.

(10) Patent No.: US 9,959,355 B2
(45) Date of Patent: May 1, 2018

(54) ASSOCIATING RELATED THREADS IN A QUESTION AND ANSWER SESSION

(71) Applicant: International Business Machines Corporation, Armonk, NY (US)

(72) Inventors: Anuradha D. Chitta, Bangalore (IN); Soumitra Limaye, Pune (IN); Ranjit S. Rai, Pune (IN); Priyanka Sharma, Pune (IN)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 14/840,522

(22) Filed: Aug. 31, 2015

(65) Prior Publication Data

US 2017/0061004 A1  Mar. 2, 2017

(51) Int. Cl.
*H04L 12/58* (2006.01)
*G06F 17/30* (2006.01)
(Continued)

(52) U.S. Cl.
CPC .. *G06F 17/30867* (2013.01); *G06F 17/30675* (2013.01); *G06F 17/30696* (2013.01);
(Continued)

(58) Field of Classification Search
CPC .............. A63F 13/10; G06F 17/30551; G06F 17/30598; G06F 17/30663;
(Continued)

(56) References Cited

U.S. PATENT DOCUMENTS 7,472,071 B2   12/2008 Marks et al.
8,312,095 B2   11/2012 Chao
(Continued)

FOREIGN PATENT DOCUMENTS

WO         0184266 A2    11/2001
WO      2007033404 A1     3/2007

OTHER PUBLICATIONS

Sethi et al., "A Social Collaboration Argumentation System for Generating Multi-Faceted Answers in Question & Answer Communities," AAAI Workshop on Computational Models of Natural Argument, San Francisco, CA, Aug. 7, 2011, 5 pages.
(Continued)

*Primary Examiner* — Le H Luu
(74) *Attorney, Agent, or Firm* — Kristofer L. Haggerty

(57) ABSTRACT

A computer detects a question from a participant and determines whether the question is marked to be directed to a particular participant. If marked, the question is directed towards the particular participant, otherwise the question is transmitted to all participants of the web conference. If the computer does not detect an answer to the question from a participant, the participants are reminded of the unanswered question. If the computer detects an answer from a participant, the computer determines whether the answer has been marked by the answering participant as related to another question and answer thread. The computer moves the question and answer to the related thread if marked as related, otherwise the question and answer are saved as a new thread. The entirety of the web conference threads are then saved by the computer in an organized database.

14 Claims, 3 Drawing Sheets

(51) Int. Cl.
  *G06Q 50/00* (2012.01)
  *H04L 29/06* (2006.01)
(52) U.S. Cl.
  CPC .. *G06F 17/30699* (2013.01); *G06F 17/30861* (2013.01); *G06Q 50/01* (2013.01); *H04L 51/16* (2013.01); *H04L 51/32* (2013.01); *H04L 51/34* (2013.01); *H04L 65/4015* (2013.01)
(58) Field of Classification Search
  CPC ............ G06F 17/30864; G06F 9/4843; G06F 17/30867; G06F 17/30861; G06F 17/30696; G06F 17/30699; G06F 17/30675; G06Q 10/10; G06Q 50/01; H04L 51/26; H04L 67/42; H04L 51/16; H04L 51/32; H04L 51/34; H04L 65/4015; H04M 3/4365
  See application file for complete search history.

(56) References Cited

U.S. PATENT DOCUMENTS

| | | | |
|---|---|---|---|
| 8,423,392 B2 | 4/2013 | Moxley et al. | |
| 8,516,379 B2 | 8/2013 | D'Angelo et al. | |
| 2003/0227479 A1* | 12/2003 | Mizrahi | A63F 13/10 715/753 |
| 2006/0026593 A1* | 2/2006 | Canning | G06F 9/4843 718/100 |
| 2006/0112392 A1* | 5/2006 | Zhang | H04L 51/26 718/102 |
| 2007/0276829 A1* | 11/2007 | Wang | G06F 17/30663 |
| 2008/0228738 A1* | 9/2008 | Li | G06F 17/30864 |
| 2009/0119371 A1 | 5/2009 | Chang et al. | |
| 2009/0125598 A1 | 5/2009 | Sun et al. | |
| 2010/0235338 A1* | 9/2010 | Gabriel | G06F 17/30864 707/706 |
| 2010/0281426 A1* | 11/2010 | Schmidt | G06F 17/30551 715/810 |
| 2011/0041082 A1* | 2/2011 | Nguyen | G06Q 10/10 715/752 |
| 2012/0229446 A1 | 9/2012 | Hyndman et al. | |
| 2013/0097178 A1 | 4/2013 | Song et al. | |
| 2013/0212109 A1* | 8/2013 | Evancich | G06F 17/30598 707/740 |
| 2013/0238520 A1 | 9/2013 | Hall et al. | |
| 2014/0068463 A1 | 3/2014 | Kay et al. | |
| 2014/0214831 A1 | 7/2014 | Chi et al. | |
| 2015/0039705 A1* | 2/2015 | Kursun | H04L 51/26 709/206 |
| 2015/0095267 A1* | 4/2015 | Behere | H04L 67/42 706/11 |
| 2016/0050316 A1* | 2/2016 | Jain | H04M 3/4365 379/221.14 |
| 2016/0196561 A1* | 7/2016 | Iyer | G06Q 50/01 705/304 |

OTHER PUBLICATIONS

IBM, List of IBM Patents or Patent Applications Treated as Related, Appendix P, dated Aug. 1, 2016, 2 pages.
Pending U.S. Appl. No. 15/216,078, filed Jul. 21, 2016, entitled: "Managing Question and Answer Sessions During a Web Conference", 27 Pages.

* cited by examiner

ASSOCIATING RELATED THREADS IN A QUESTION AND ANSWER SESSION

TECHNICAL FIELD

The present invention relates generally to remote communication, and more particularly to question and answer sessions.

BACKGROUND

Question and answer sessions, or Q&A sessions, are frequently used in business for remote communication. The conferences may range from two participants to hundreds or thousands of participants all connecting simultaneously. As more participants are added, however, Q&A sessions may become hard to follow, convoluted, and make communication between specific participants difficult.

SUMMARY

Embodiments of the present invention disclose a method, system, and computer program product for managing question and answer sessions during a web conference. A computer detects a question from a participant and determines whether the question is marked to be directed to a particular participant. If marked, the question is directed towards the particular participant, otherwise the question is transmitted to all participants of the Q&A session. If the computer does not detect an answer to the question from a participant within a designated period of time, the participants are reminded of the unanswered question. If the computer detects an answer from a participant, the computer determines whether the answer has been marked by the answering participant as related to another question and answer thread. The computer moves the question and answer to the related thread if marked as related, otherwise the question and answer are saved as a new thread. The entirety of the Q&A session is saved as threads by the computer in an organized database.

DETAILED DESCRIPTION

Embodiments of the present invention will now be described in detail with reference to the accompanying figures.

Figure 1:
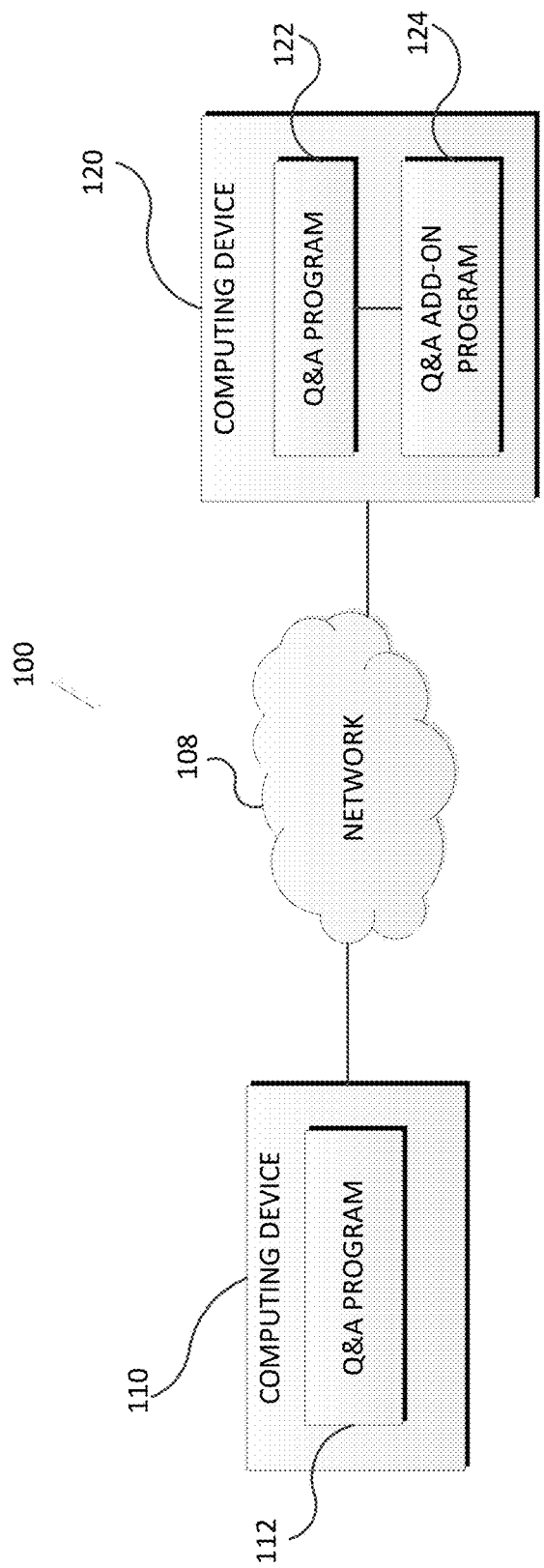
FIG. 1 illustrates a managing Q&A system 100, in accordance with an embodiment of the invention.

FIG. 1 illustrates a managing Q&A system 100, in accordance with an embodiment of the invention. In the example embodiment, managing Q&A system 100 includes computing device 110, network 108, and computing device 120.

In the example embodiment, network 108 may be the Internet, representing a worldwide collection of networks and gateways to support communications between devices connected to the Internet. Network 108 may include, for example, wired, wireless or fiber optic connections. In other embodiments, network 108 may be implemented as an intranet, a local area network (LAN), or a wide area network (WAN). In general, network 108 can be any combination of connections and protocols that will support communications between computing device 110 and computing device 120.

Computing device 110 includes Q&A program 112. In the example embodiment, computing device 110 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 110 is shown as a single device, in other embodiments, computing device 110 may be comprised of a cluster or plurality of computing devices, working together or working separately. Computing device 110 is described in more detail with reference to FIG. 3.

Q&A program 112 is an application on computing device 110 capable of transmitting and receiving real-time messages and information over an internet, such as network 108, between devices such as computing device 110 and computing device 120. In the example embodiment, Q&A program 112 is capable of hosting bi-directional transmissions (two-way) as well as multicast transmissions (chat room). In the example embodiment, Q&A program 112 supports file transfers, hyperlinks, and other data transfers. Furthermore, in the example embodiment, Q&A program 112 is client-server based where a central server retransmits data between users. In other embodiments, Q&A program 112 may transmit data peer-to-peer (direct point-to-point transmission). In the example embodiment, Q&A program 112 contains a registry of registered users and associated devices.

Computing device 120 includes Q&A program 122 and Q&A add-on program 124. In the example embodiments, computing device 120 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 120 is shown as a single device, in other embodiments, computing device 120 may be comprised of a cluster or plurality of computing devices, working together or working separately. Computing device 120 is described in more detail with reference to FIG. 3.

Q&A program 122 is an application on computing device 120 capable of transmitting and receiving real-time messages and information over an internet, such as network 108, between devices such as computing device 110 and computing device 120. In the example embodiment, Q&A program 122 is capable of hosting bi-directional transmissions (two-way) as well as multicast transmission (chat room). In the example embodiment, Q&A program 122 supports file transfers, hyperlinks, and other data transfers. Furthermore, in the example embodiment, Q&A program 122 is client-server based where a central server retransmits data between users. In other embodiments, Q&A program 122 may transmit data peer-to-peer (direct point-to-point transmission). In the example embodiment, Q&A program 122 contains a registry of registered users and associated devices.

Q&A add-on program 124 is an application stored on computing device 120 capable of providing additional and improved functionality to Q&A program 122. While in the example embodiment Q&A add-on program 124 is integrated with Q&A program 122, in other embodiments, Q&A add-on program 124 may be a standalone program capable of performing the operations of Q&A program 122. In the example embodiment, Q&A add-on program 124 is stored on computing device 120, however in other embodiments, Q&A add-on program 124 may be stored remotely on computing device 110, dedicated servers, or other storage media, and accessed by computing device 120 via network 108. Q&A add-on program 124 is capable of altering communications between devices, such as computing device 110 and computing device 120, as well as transmitting communications to specific devices within a multicast transmission. Furthermore, Q&A add-on program 124 is capable of alerting devices of unanswered communications, grouping related communications together, and storing the communications in a structured and organized collection. In the example embodiment, the transcribed communications are stored locally on computing device 120, however in other embodiments, the transcribed communications may be stored remotely and access via a network such as network 108.

Figure 2:
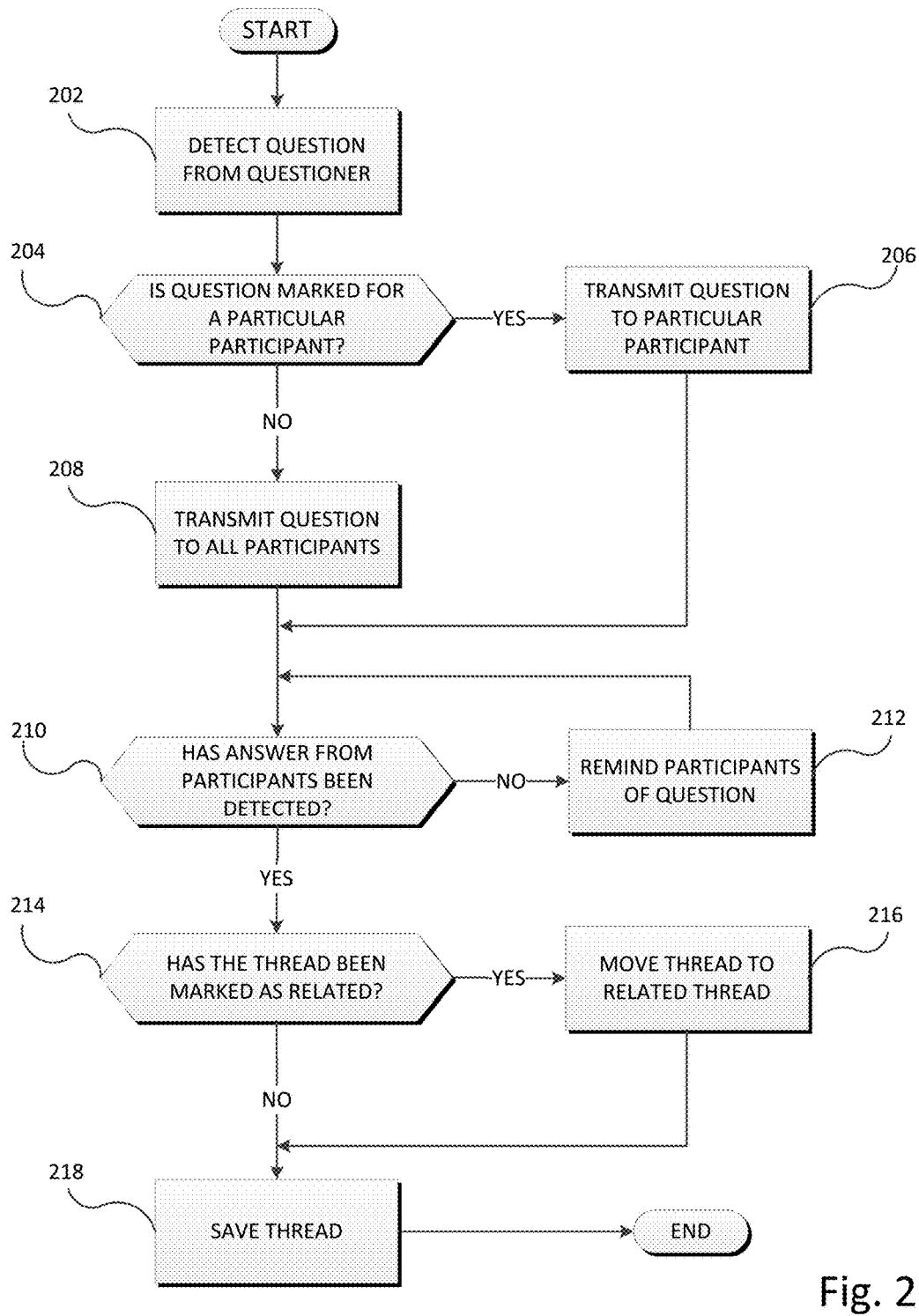
FIG. 2 is a flowchart illustrating the operations of Q&A add-on program 124 of FIG. 1 in implementing addition functionality to a question and answer sessions, in accordance with an embodiment of the invention.

FIG. 2 is a flowchart depicting the operations of Q&A add-on program 124 in providing participants the options of directing questions to specific respondents, reminding respondents of unanswered questions, and grouping related threads together, in accordance with an embodiment of the invention. In the example embodiment, participants register themselves in a database within Q&A add-on program 124 at the time of installation and/or configuration. The registration database details the participant's name, contact information, device(s), location, internet protocol (IP) address, media access control (MAC) address, network, and any other information relevant to communicating with the participant. In addition, participants can link their schedules as well for scheduling convenience. While registration need only be performed by a participant once, participants have the option of editing their registration information at any time through a user interface. The registration information contained in the database is accessible to all users of Q&A add-on program 124 such that inviters of a web conference can identify and select specific participants while invitees can select a preferred device or location.

In the example embodiment where a questioner inputs their question on computing device 110, Q&A add-on program 124 detects a question from the questioner via network 108 and integration with Q&A program 122 (step 202). In other embodiments where improved Q&A 124 is stored locally, such as on computing device 120, Q&A add-on program 124 detects a question from a questioner, such as the user of computing device 110, via integration with Q&A program 122. In the example embodiment, a questioner (the user of computing device 110) inputs a question into Q&A program 112 via a user interface, with the question being transmitted to computing device 120 via network 130. Q&A add-on program 124 adds a prefix to the question which identifies the originating device (in this case computing device 110) or, if the user so chooses, a custom prefix identifying the questioner. In the example embodiment, a questioner inputs the custom prefix into a user interface on a computing device, such as computing device 110. The prefix is added before the question and denoted by being to the left of a colon in left-to-right reading languages. For example, if questioner Alpha on computing device 110 would like to ask a respondent on computing device 120 "what was the fourth quarter profit?", then Q&A add-on program 124 detects the question: "Computing Device 110: What was the fourth quarter profit?" via network 108 and integration with Q&A program 122. Similarly, if questioner Alpha has input a custom prefix identifying themselves as "Alpha" or "Test Engineer," then Q&A add-on program 124 detects the question "Alpha: What was the fourth quarter profit?" or "Test Engineer: What was the fourth quarter profit?", respectively.

Q&A add-on program 124 determines whether the question has been marked for a particular participant by analyzing the user input containing the question (decision 204). In the example embodiment, when the questioner submits a question to the web conference the questioner is provided a dropdown list enumerating the participants (or their respective devices) within the web conference. From the dropdown list, a questioner may select to direct their question to every participant within the web conference, a specific participant, or pre-selected groups of participants. In the example embodiment, Q&A add-on program 124 adds participants and their respective devices to the dropdown list as they join the web conference, however individual and pre-selected group settings and assignments may be edited by an administrator or user via a user interface on computing device 120 at any time, such as when sending invitations to the web conference. In other embodiments, Q&A add-on program 124 may utilize check boxes, radial buttons, or other selection means to direct questions to particular participants. In the example embodiment, if the questioner makes no selection at the participant selection dropdown list, the question is directed to all participants, by default.

If the questioner has indicated that they would like to transmit their question to a specific participant (decision 204 "YES" branch), then Q&A add-on program 124 directs the question to the selected participant or the selected group of participants (step 208). Q&A add-on program 124 directs a question to the selected participants by limiting transmission of the question by Q&A program 122 to only the devices corresponding to the selected participants. A questioner directs their question to a specific participant or group of participants by selected the participant or group from a drop down list provided on a user interface. The drop down list is populated with the confirmed participants of the conference using the information provided during the configuration and registration process. While in the example embodiment only designated participants may answer a directed question, all participants will be able to view the thread once the question is answered. In other embodiments, however, specific threads directed to particular participants may be confidential and only accessible to particular participants. Continuing the example above, if questioner Alpha on computing device 110 indicates that they would like to specifically ask participant Beta "what was the fourth quarter profit?", then Q&A add-on program 124 identifies the preference within the received information, determines the device that corresponds to Beta, and transmits the question to the device that corresponds to respondent Beta only. After Beta answers the question, the thread may then become visible to all participants in the conference depending on the user-set preferences.

If the questioner has not indicated that they would like to direct their question to a specific participant (or has not made a participant selection at all) (decision 204 "NO" branch), then Q&A add-on program 124 directs the question to all the participants in the web conference (step 208). In the example embodiment, questions presented to all the participants are visible by all members of the conference. Q&A add-on program 124 directs a question to all participants by allowing transmission of the question by Q&A program 122 to all participants. Using the example above, if questioner Alpha does not have a preference as to which participant answers the question, then Q&A add-on program 124 transmits the question to all participants of the web conference. All participants can view the question and answer thread before the question is answered.

Q&A add-on program 124 detects whether an answer has been provided by the participants (decision 210). Q&A add-on program 124 detects whether the question has been answered by a participant by monitoring the question and answer thread. When a participant answers a question, they select the question from a dropdown list of available questions. Selecting the thread opens an interface with a field for answering the question, an option to link an existing answer, and an option to mark the thread as related to an existing thread. Q&A add-on program 124 monitors the thread by detecting whether the answer field of the aforementioned interface has been filled in and submitted. Using the example above, if questioner Alpha asks participant Beta "what were the fourth quarter profits?", then improved Q&A program 122 monitors the thread for submitted answers.

If an answer has not been detected by Q&A add-on program 124 (decision 210 "NO" branch), then Q&A add-on program 124 reminds the participants of the unanswered question (step 212). In the example embodiment, Q&A add-on program 124 will remind the participants of an unanswered question if a time period, such as five minutes, has lapsed, or if the questioner has manually requested a reminder through a user input. A questioner may remind participant(s) of an unanswered question by selecting the unanswered question thread within a user interface and selecting an option to remind the participant(s). Within the interface, the aforementioned dropdown list of registered participants and pre-selected groups are displayed such that a questioner can select to remind a specific participant, several participants, or one of the pre-selected groups of participants when reminded. If Q&A add-on program 124 detects a user input from a questioner requesting a participant be reminded of the unanswered question, then Q&A add-on program 124 highlights the unanswered question in red to attract the attention of a participant. In other embodiments, Q&A add-on program 124 may illustrate an exclamation point, arrow, or other attention grabbing means to notify a participant of an unanswered question. In the example above where questioner Alpha is specifically asking Beta "what were the fourth quarter profits?", if Beta does not answer the question after either five minutes have elapsed or a participant manually requests a reminder, then Q&A add-on program 124 reminds Beta of the question by highlighting the unanswered question.

If an answer from a respondent has been detected by Q&A add-on program 124 (decision 210 "YES" branch), then Q&A add-on program 124 determines whether the responding participant has indicated that the question and answer, or thread, is related to other threads (decision 214). Q&A add-on program 124 determines whether a respondent has indicated that the thread is related to other threads by checking the respondent answer for an indication that the thread is related to an existing thread. Existing threads include the threads of the current web conference as well as any previously saved web conferences that are pre-selected by a system administrator or the organizer of the web conference. Furthermore, in some embodiments, respondents may be provided access to libraries of existing web conferences organized by date, topic, participants, etc. from which related threads can be selected. In the example embodiment, Q&A add-on program 124 suggests which existing threads may be related to the current question by searching existing threads for similar keywords or topics to the current question and presenting the related threads as options for selection. Q&A add-on program 124 determines which keywords to search for (when searching for existing threads) by eliminating noise (such as words "the" or "and") and utilizing natural language processing techniques in analyzing the question and determining a topic/keyword which may then be searched for in existing threads. Keywords may be taken from the title of the conference, questions posed by questioners, or other information associated with the conference, such as a conference description or details. Furthermore, Q&A add-on program 124 may reference a database of keywords which may then be used to identify keywords for within the question and such keywords may be assigned weights such that keywords particularly relevant to the question or conference are given additional consideration. After identifying keywords within the question, Q&A add-on program 124 searches for the matching keywords in existing threads. The existing threads containing the highest weighted value of keywords are then listed in a dropdown menu in descending order. Continuing the example above regarding questioner Alpha asking participant Beta "what were the fourth quarter profits?", if the keyword "profit" is assigned a weight of 5 and the keywords "quarter" and "fourth" are assigned a weight of 1, then Q&A add-on program 124 assigns Existing Thread 1 containing the phrase "profits for the year are ten million" a weighted value of 5. Furthermore, continuing the example, if Existing Thread 2 contains the phrase "fourth quarter showed an 8% growth", then Q&A add-on program 124 assigns Existing Thread 2 a weighed value of 2 and lists Existing Thread 1 above Existing Thread 2 on the dropdown list of the user interface. In other embodiments, Q&A add-on program 124 may only display existing threads that exceed a threshold limit of keywords, such as requiring 5 keywords present in the current thread be present in an existing thread. In further embodiments, Q&A add-on program 124 may utilize a weighted average or weighted median to determine whether the amount of keywords exceeds the threshold. In even further embodiments, Q&A add-on program may only consider existing threads related if keywords are within a certain distance of each other, such as requiring 3 keywords be present and within 25 characters of each other in an existing thread. Alternatively, in other embodiments, a respondent may indicate that a related thread exists by manually searching for and selecting the related thread from a user interface when submitting an answer. In further embodiments, related threads may be preselected by an inviter when organizing the web conference. For example, the inviter of a fourth quarter meeting may preselect the first, second, and third quarter conferences as related threads to be available for linking during the fourth quarter conference. These preselected threads may be included in the invitation such that invitees can read the related, existing threads prior to attending the pending web conference—providing the invitee an opportunity to see whether the invitee's question has been addressed in previous conference and eliminating the need to attend the pending conference.

If the thread has been marked as related to an existing thread (decision 214 "YES" branch), Q&A add-on program 124 detects the user input selection and moves the related thread to the selected thread (step 216). In the example above, if respondent Beta determines that the question of fourth quarter profits is related to another thread regarding annual profits and marks the answer as such, then Q&A add-on program 124 moves the current question and answer regarding fourth quarter profits to the thread regarding annual profits. In other embodiments, questions marked as related may be linked to the existing thread with a hyperlink or other forwarding button.

If the thread has not been marked as related to an existing thread (decision 214 "NO branch"), then Q&A add-on program 124 saves the thread as a new thread (step 218). In the example embodiment, threads are saved locally on computing device 120, however, in other embodiments threads may be saved remotely and accessed via network 108. In the example embodiment, threads are named according to the date and time of the web conference, however web conference names, details, and notes can be added manually via a user input accessed locally or remotely. In the example above, if respondent Beta does not mark the fourth quarter profit question as related to any existing threads, a new thread is started for the current question regarding fourth quarter profits. In the example embodiment, new threads (as well as any linked, existing threads) are saved locally on computing device 120, however in other embodiments, new threads may be saved remotely via network 108.

Figure 3:
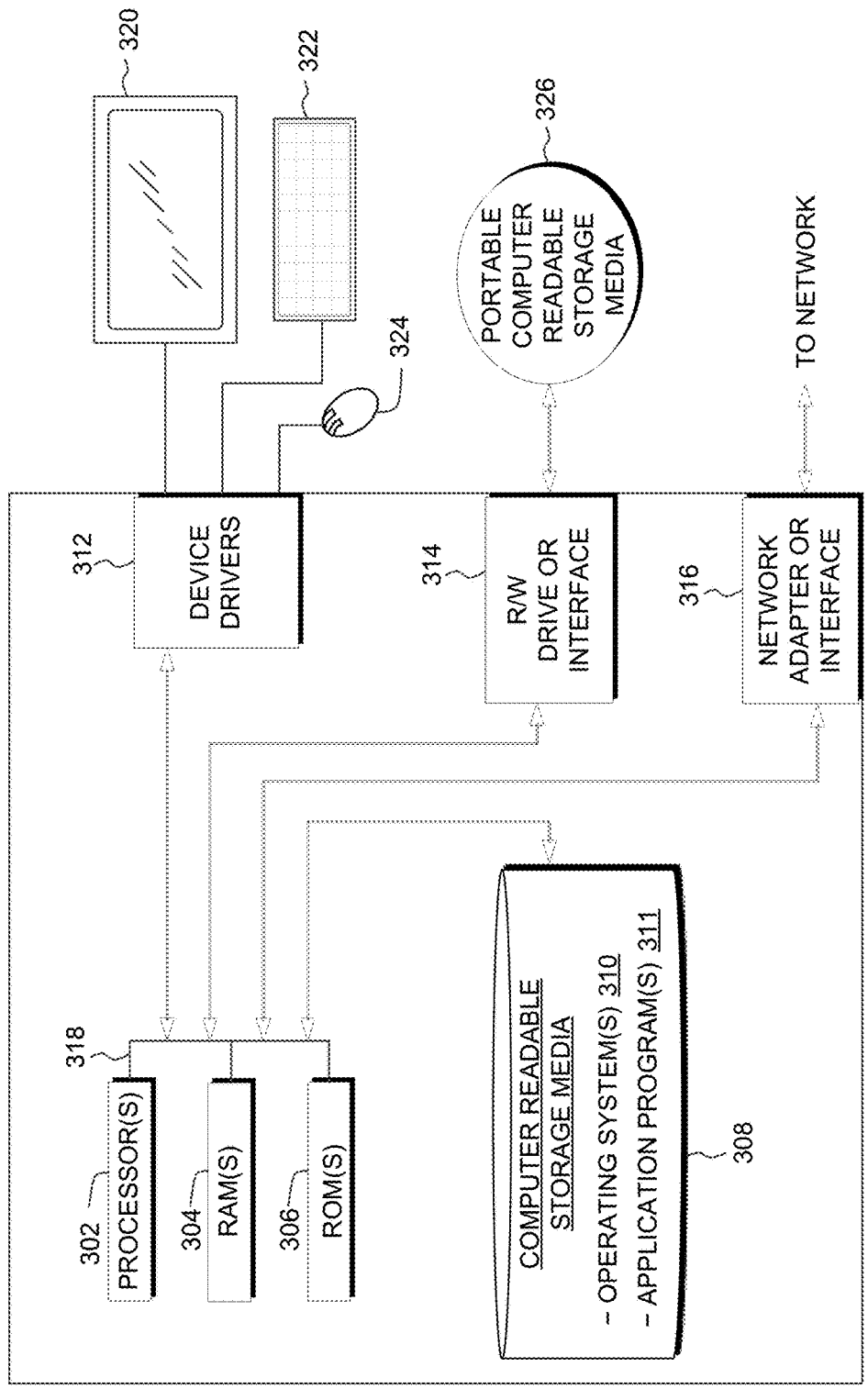
FIG. 3 is a block diagram depicting the hardware components of a managing Q&A system 100 of FIG. 1, in accordance with an embodiment of the invention.

FIG. 3 depicts a block diagram of components of computing device 120 of a web conference system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 120 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311, for example, Q&A add-on program 124, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 120 may also include a R/W drive or interface 314 to read from and write to one or more portable computer readable storage media 326. Application programs 311 on computing device 120 may be stored on one or more of the portable computer readable storage media 326, read via the respective R/W drive or interface 314 and loaded into the respective computer readable storage media 308.

Computing device 120 may also include a network adapter or interface 316, such as a TCP/IP adapter card or wireless communication adapter (such as a 4G wireless communication adapter using OFDMA technology). Application programs 311 on computing device 120 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Computing device 120 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for a web conference system, the computer program product comprising:
    one or more non-transitory computer-readable storage media and program instructions stored on the one or more computer-readable storage media, the program instructions comprising:
    program instructions to detect a question from a first participant in a web conference, wherein the web conference includes one or more participants;
    program instructions to determine whether one or more existing threads relate to the question, wherein the one or more existing threads includes one or more question and answer sets, and wherein determining whether one or more existing threads relate to the question further comprises determining whether one or more keywords contained in the question are present in the one or more question and answer sets of the one or more existing threads;
    based on determining that one or more existing threads relate to the question, program instructions to associate the one or more existing threads with the question;
    program instructions to determine whether the question has been answered by the one or more participants; and
    based on determining that the question has not been answered by the one or more participants, program instructions to transmit a reminder to at least one of the one or more participants.

2. The computer program product of claim 1, further comprising:
    based on determining that the one or more existing threads do not relate to the question, program instructions to create a new thread that includes the question.

3. The computer program product of claim 1, further comprising:
    program instructions to determine whether the question is directed to a second participant of the one or more participants to answer the question; and
    based on determining that the question is directed to the second participant, program instructions to transmit the question to the second participant.

4. The computer program product of claim 1, further comprising:

based on determining that the question has not been answered by the one or more participants, program instructions to visually emphasize the question.

5. The computer program product of claim 1, wherein determining whether one or more existing threads relate to the question further comprises:
program instructions to remove noise from the question;
program instructions to identify one or more keywords within the question;
program instructions to assign a weight value to each of the one or more keywords;
program instructions to search the one or more existing threads for the one or more keywords;
program instructions to sum the assigned weight values of the one or more keywords found within the one or more existing threads; and
program instructions to display the one or more existing threads in descending order based on the summed weight values.

6. The computer program product of claim 1, wherein determining whether the one or more existing threads relate to the question further comprises:
program instructions to identify one or more keywords within the question;
program instructions to assign a threshold keyword value;
program instructions to search the one or more existing threads for the one or more keywords;
program instructions to determine whether an amount of the one or more keywords found within the one or more existing threads exceeds the threshold keyword value; and
based on determining that the amount of the one or more keywords found within the one or more existing threads exceeds the threshold keyword value, program instructions to display the one or more existing threads in which the amount of the one or more keywords exceeds the threshold keyword value in descending order.

7. The computer program product of claim 1, wherein the one or more existing threads may be selected by the one or more participants.

8. A computer system for a web conference system, the computer system comprising:
one or more computer processors, one or more computer-readable storage media, and program instructions stored on one or more of the computer-readable storage media for execution by at least one of the one or more processors, the program instructions comprising:
program instructions to detect a question from a first participant in a web conference, wherein the web conference includes one or more participants;
program instructions to determine whether one or more existing threads relate to the question, wherein the one or more existing threads includes one or more question and answer sets, and wherein determining whether one or more existing threads relate to the question further comprises determining whether one or more keywords contained in the question are present in the one or more question and answer sets of the one or more existing threads;
based on determining that one or more existing threads relate to the question, program instructions to associate the one or more existing threads with the question;

program instructions to determine whether the question has been answered by the one or more participants; and
based on determining that the question has not been answered by the one or more participants, program instructions to transmit a reminder to at least one of the one or more participants.

9. The computer system of claim 8, further comprising:
based on determining that the one or more existing threads do not relate to the question, program instructions to create a new thread that includes the question.

10. The computer system of claim 8, further comprising:
program instructions to determine whether the question is directed to a second participant of the one or more participants; and
based on determining that the question is directed to the second participant, program instructions to transmit the question to the second participant.

11. The computer system of claim 8, further comprising:
based on determining that the question has not been answered by the one or more participants, program instructions to visually emphasize the question.

12. The computer system of claim 11, wherein the program instructions to visually emphasizing the question further comprise an action selected from the group comprising highlighting the question, displaying an exclamation point in association with the question, and displaying an arrow in association with the question.

13. The computer system of claim 8, wherein determining whether one or more existing threads relate to the question further comprises:
program instructions to remove noise from the question;
program instructions to identify one or more keywords within the question;
program instructions to assign a weight value to each of the one or more keywords;
program instructions to search the one or more existing threads for the one or more keywords;
program instructions to sum the assigned weight values of the one or more keywords found within the one or more existing threads; and
program instructions to display the one or more existing threads in descending order based on the summed weight values.

14. The computer system of claim 8, wherein determining whether the one or more existing threads relate to the question further comprises:
program instructions to identify one or more keywords within the question;
program instructions to assign a threshold keyword value;
program instructions to search the one or more existing threads for the one or more keywords;
program instructions to determine whether an amount of the one or more keywords found within the one or more existing threads exceeds the threshold keyword value; and
based on determining that the amount of the one or more keywords found within the one or more existing threads exceeds the threshold keyword value, program instructions to display the one or more existing threads in which the amount of the one or more keywords exceeds the threshold keyword value in descending order.

* * * * *